United States Patent [19]

Tregre

[11] 4,125,234
[45] Nov. 14, 1978

[54] EMERGENCY CIRCULATING SYSTEM FOR AN AIRCRAFT HYDRAULIC BRAKE SYSTEM

[76] Inventor: George W. Tregre, 2325 Queen, Ft. Worth, Tex. 76103

[21] Appl. No.: 873,113

[22] Filed: Jan. 30, 1978

Related U.S. Application Data

[62] Division of Ser. No. 772,816, Feb. 28, 1977, abandoned.

[51] Int. Cl.$^2$ ............................................. B64C 25/42
[52] U.S. Cl. ..................................... 244/111; 188/16; 188/351; 188/354; 303/10
[58] Field of Search ................. 244/111; 188/2 R, 16, 188/151 R, 151 A, 152, 351, 352, 354; 303/1, 2, 6 R, 9, 10, 11, 14

[56] References Cited

U.S. PATENT DOCUMENTS

| 2,150,617 | 3/1939 | Weihe | 188/152 |
| 2,365,557 | 12/1944 | Keith | 188/152 |
| 2,692,662 | 10/1954 | Clifton | 244/111 |
| 2,742,982 | 4/1956 | Helmbold | 188/152 |
| 3,920,285 | 11/1975 | DeVlieg | 244/111 |
| 4,038,823 | 8/1977 | Mostert | 188/352 |

FOREIGN PATENT DOCUMENTS

| 46,508 | 2/1963 | Poland | 303/2 |
| 444,930 | 3/1936 | United Kingdom | 188/352 |

Primary Examiner—Edward R. Kazenske
Attorney, Agent, or Firm—Wofford, Felsman, Fails & Zobal

[57] ABSTRACT

A circulating system for hydraulic brakes having a master cylinder, reservoir for supplying fluid to the master cylinder, a wheel cylinder, and a fluid line connecting the master cylinder with the wheel cylinder. The circulating system includes a pump connected in a fluid line from the reservoir to the bleedoff port of the wheel cylinder. A check valve is connected between the pump and wheel cylinder to allow flow only in the direction from the wheel cylinder to the master cylinder. The pressure exerted by the pump is insufficient to cause braking. The check valve allows conventional braking by the master cylinder while the pump maintains a supply of fluid.

4 Claims, 2 Drawing Figures

EMERGENCY CIRCULATING SYSTEM FOR AN AIRCRAFT HYDRAULIC BRAKE SYSTEM

CROSS REFERENCE TO RELATED APPLICATIONS

This is a Divisional of application Ser. No. 772,816 filed Feb. 28, 1977 now abandoned.

BACKGROUND OF THE INVENTION

1. Field of the Invention

This invention relates in general to hydraulic brake systems and in particular to a circulating system for vehicle hydraulic brakes.

2. Description of the Prior Art

Leakage of brake fluid and resulting brake failure are serious problems for vehicles, particularly the hydraulic brakes of aircraft. Aircraft brakes, like those in automobiles and trucks, have a reservoir, master cylinder, and wheel cylinders. Depression of the brake pedal applies pressure from the master cylinder to the wheel cylinder, pressing the brake pads against the wheel drum. As the fluid surges forward, air is drawn into the reservoir from the vent. Moisture from the air condenses, and this water being heavier than hydraulic fluid sinks to the wheel cylinders. The accumulation of water causes pitting of the wheel cylinders and piston, allowing leakage past the O-ring seals. In addition the accumulation of water may freeze causing complete brake failure.

Should a leak develop or the brakes freeze, landing an aircraft can be highly dangerous, particularly on tail wheel planes that rely on brakes for steering. As the brakes are pumped, more air is drawn in through the point of leakage, making the brakes even softer.

Also repairing the brakes in an aircraft or any vehicle is a nuisance. To remove the air from the line, the fluid has to be bled through a port as the brakes are pumped. This is time consuming and often results in wasted fluid.

Others have recognized the disadvantages of conventional noncirculating hydraulic brake systems. In U.S. Pat. No. 3,520,136, a return line from the bleedoff port to the reservoir is provided with a metering device that allows a small amount of fluid to return. Thus the system self-circulates in the normal direction as the brakes are pumped. Should a leak occur, a pressure tank applies pressure to the fluid in the main lines. In that device, however, conventional bleeding would have to be used for repairs, and the emergency system is complex and would not allow selective braking for steering a tail wheel aircraft.

SUMMARY OF THE INVENTION

It is accordingly a general object of this invention to provide an improved hydraulic brake system.

It is a further object to provide an emergency device for hydraulic brakes that allows the brake pedals to be normally operated for braking even though a substantial leak develops.

It is a further object to provide an improved hydraulic brake system in which the lines do not have to be bled, even after repairs.

In accordance with these objects, a hydraulic brake system is provided with a circulation system for circulating fluid in reverse to the normal direction of flow that occurs when the brake pedal is depressed. A fluid line is connected between the reservoir and the bleedoff port of the wheel cylinder. An electrically driven hydraulic pump is connected within the fluid line for pumping fluid directly to the wheel cylinder and back through the master cylinder to the reservoir. The pressure of the pump is insufficient to cause braking. A check valve is located between the wheel cylinder and the pump for preventing flow in the opposite or normal direction. The pedal actuated master cylinder has a much greater maximum pressure than the pump and will override it for conventional braking. Once the pedal is released the check valve opens again and the fluid continues to circulate in reverse. Consequently a supply of fluid is maintained at the wheel cylinder and fluid line even though a substantial leak has occurred.

DESCRIPTION OF THE PREFERRED EMBODIMENT

Figure 1:
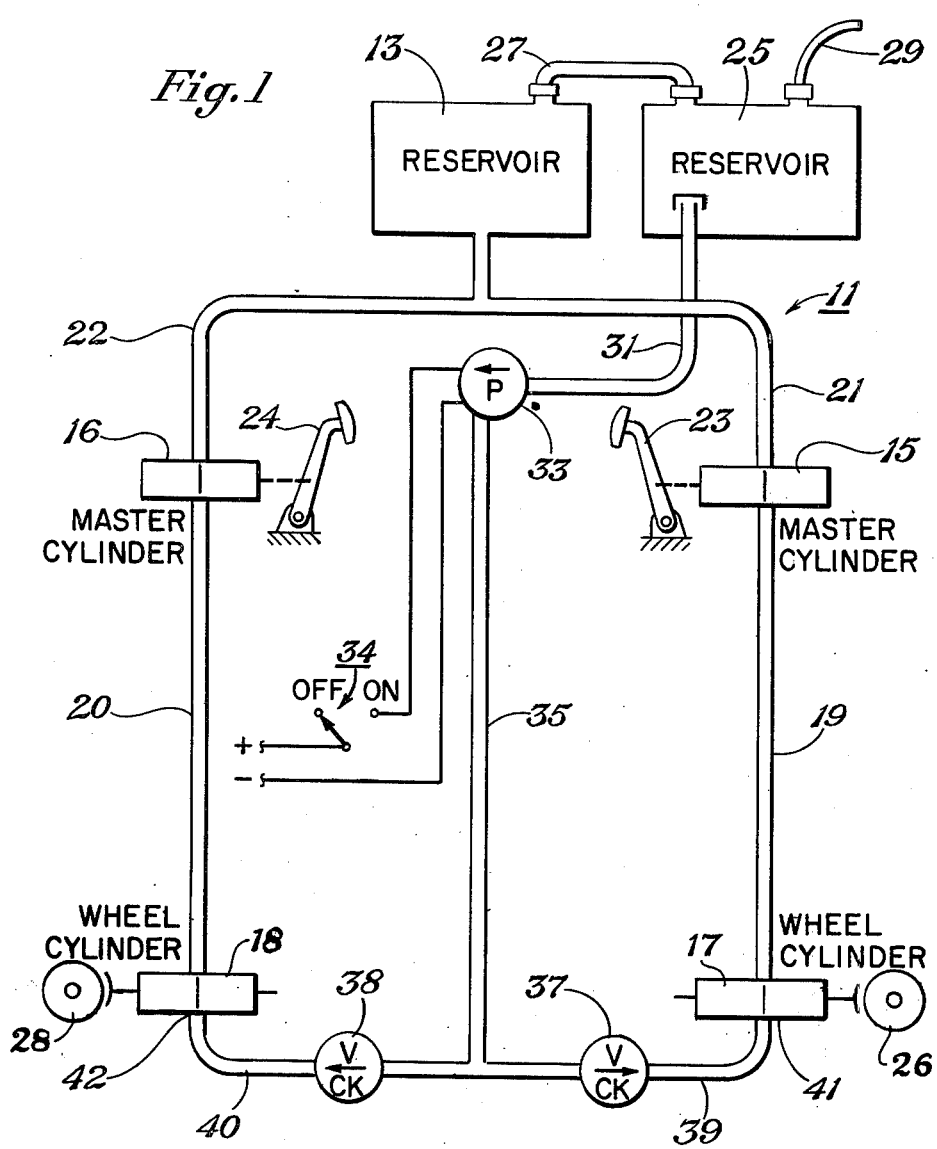
FIG. 1 is a schematic illustration of a hydraulic brake system for an aircraft incorporating the teachings of the present invention.

The aircraft hydraulic brake system 11 of FIG. 1 includes a first reservoir 13, two master cylinders 15, 16, two wheel cylinders 17, 18 and fluid lines 19, 20 connecting the master cylinders to the wheel cylinders. The master cylinders 15, 16 are in communication with the reservoir 13 by fluid lines 21, 22. Fluid lines 21, 22 connect the bottom of reservoir 13 with the master cylinders 15, 16 for gravity flow, and may be very short passages. Pedals 23, 24 are connected with each master cylinder 15, 16 for applying pressure to the output of each master cylinder when the pedal is depressed. The wheel cylinders 17, 18 have one or more pistons (not shown) that move in response to the pressure increase to bring a pad or shoe against a disc or drum (not shown) for braking. Right and left wheel brakes are illustrated schematically as 26, and 28, and respectively.

A second reservoir 25, which may be formed integrally with the first reservoir 13, is connected by an overflow conduit 27 to the first reservoir 13. Overflow conduit 27 is connected from the top of reservoir 13 to the top of reservoir 25 to dump fluid that overflows from reservoir 13 into reservoir 25. Reservoir 25 has a vent 29 to atmosphere.

A fluid line 31 extends from reservoir 25 to the input of pump means or pump 33. The entrance of fluid line 31 is spaced upward a short distance from the bottom of reservoir 25 to allow gravity flow to pump 33 down to a selected level in reservoir 25. Pump 33 is an electrically driven hydraulic pump, connected to a power source through switch 34, with a fairly low maximum pressure. Approximately eight pounds per square inch maximum and thirty gallons per hour have been found satisfactory.

A fluid line 35 extends from the output of pump 33 to valve means or check valves 37, 38. Check valves 37, 38 are directly coupled or connected by fluid lines 39, 40 to the bleedoff ports, indicated as 41, 42 or each wheel cylinder 17, 18. Preferably fluid lines 39, 40 are very short lines to minimize any possibility of a leak developing between the bleedoff port and check valve. Each check valve 37, 38 is a one way valve, allowing fluid to be pumped from pump 33 through fluid lines 39, 40, into fluid lines 19, 20, but preventing flow in the opposite direction. They are normally spring-biased closed, but will open by pressure of pump 33. The maximum pressure of pump 33 is insufficient to actuate wheel cylinders 17, 18 to cause braking, or even a slight drag. It is far less than the pressure exerted by the master cylinders 15, 16, which may be six hundred pounds per square inch or greater is substantial force is exerted on the pedals 23, 24.

In operation, both reservoirs 13 and 25 are filled. If a repair has been completed, or if air or moisture is suspected in the fluid lines, then pump 33 is actuated by switch 34 to reverse circulate. Pump 33 pumps fluid from reservoir 25 through the fluid lines 35, 39, 40, past the check valves 37, 38, and into bleedoff ports 41, 42 and wheel cylinders 17, 18. Fluid then flows into fluid lines 19, 20, master cylinders 15, 16 and into reservoir 13. Once reservoir 13 fills, it overflows into reservoir 25 via conduit 27. Air will be carried by the circulation and vented through vent 29. Once bled, pump 33 may be turned off. The brakes 26, 28 are used conventionally be depressing pedals 23, 24, which pressurizes the fluid in fluid lines 19, 20 to actuate the wheel cylinders 17, 18. Check valves 37, 38 prevent any flow through fluid line 35 to pump 33.

If one discovers that the brakes are becoming soft because of a leak, pump 33 is energized to supply fluid to the wheel cylinders 17, 18 by actuating switch 34 to the "on" position. Within seconds, any air previously drawn in by pumping the brakes will be circulated out, and the wheel cylinders 17, 18 and lines 19, 20 filled so that full brakes will be available. When it becomes necessary to apply the brakes, the brake 26, 28 pedals 23, 24 are depressed normally while the pump 33 is still energized. Each depression overrides the pump 33 and interrupts circulation of the fluid momentairly by the closure of check valves 37, 38. While circulating with a substantial leak, eventually all of the fluid would be pumped out, thus repairs should be made as soon as possible. Even if no leaks are suspected, as a safety practive, one may leave the pump on during critical maneuvers, such as during landing of an aircraft, since the circulation does not interfere with braking. The reverse circulation will assure full braking power should a leak suddenly develop.

Figure 2:
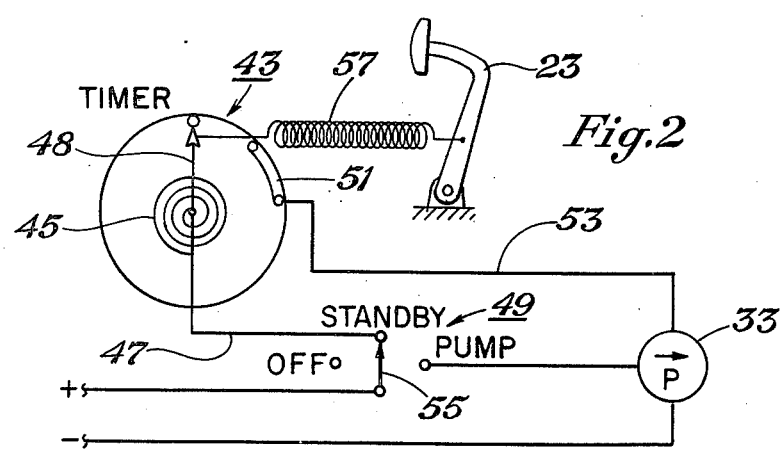
FIG. 2 is a schematic illustration of an alternate means for energizing the pump of the hydraulic brake system of FIG. 1.

FIG. 2 discloses an alternate device to switch 34 for energizing pump 33. The device of FIG. 2 is a timer means 43 for actuating the pump 33 for a short time interval, such as 3 minutes, if the stroke of pedals 23 or 24 becomes abnormally large. This means for automatically energizing the pump should a leak occur avoids requiring a pilot or driver of a ground vehicle to actuate a switch if the brakes suddenly fail. Timer 43 is spring loaded, as indicated at 45, and geared to slowly unwind. The timer 43 has a wiper arm 48 and is connected by wire 47 to a switch 49. Timer 43 has an electrode strip 51 connected by a wire 53 to the pump 33. Switch 49 has three positions and a pole 55 connected to one side of the power supply. In the "pump" position, the circuit is completed to the pump 33. In the "standby" position, wire 47 of the timer 43 is placed in communication with one side of the power source. Wiper arm 48 is connected by spring 57 to foot pedal 23. Under normal travel when depressing the pedal, wiper arm 48 will not contact the electrode strip 51. If the brakes become soft due to a leak, air will be drawn into the line and the stroke of the pedal will become longer as the air compresses. This will cause wiper arm 48 to contact electrode strip 51, energizing the pump. After the time interval has passed, the pump will de-energize. A micro switch set at a selected stroke distance could be used as well, with or without a timer, or the timer could be electronic.

It should be apparent that an invention having significant advantages has been provided. The brake circulation system provides a supply of fluid for braking, even though a substantial leak develops, yet allows the normal pedal brakes to be used. The circulation system avoids bleeding of the line after repair work. Periodic circulation will also cause the moisture in the line to be drawn past the warm firewall near the vehicle engine, causing evaporation. Detritus can be filtered by circulation also. Should accumulated moisture cause freezing of the wheel cylinder, warm fluid circulated across the firewall of the engine may cause the frozen moisture in the wheel cylinder to melt.

Having described the invention in connection with certain embodiments thereof, it is understood that further modifications may suggest themselves to those skilled in the art and it is intended to cover such modifications as fall within the scope of the amended claims. For example the second reservoir may be omitted entirely, although it is preferred to include it to increase fluid storage capacity. Also, although described in connection with an aircraft having two master cylinders, and wheel cylinders on two wheels, the principle of this invention applies as well to automobiles and trucks having hydraulic brake systems. Normally only one master cylinder is used and wheel cylinders will be connected to four wheels in the case of automobiles and trucks. A single pedal actuates the single master cylinder to apply pressure to the fluid in all four lines extending from the master cylinder to the wheel cylinders. Check valves would be located at each wheel and a single hydraulic pump would reverse circulate through all four wheel cylinders.

I claim:

1. An aircraft hydraulic brake system having an emergency fluid circulating system for maintaining a supply of fluid in the fluid lines should a leak occur, comprising:

a first master cylinder;
a first wheel cylinder connected to a first wheel brake on one side of the aircraft;
a first fluid line extending directly between the first wheel cylinder and the first master cylinder;
a first brake pedal connected to the first master cylinder;
a second master cylinder;
a second wheel cylinder connected to a second wheel brake on the side of the aircraft opposite the first wheel brake;
a second fluid line extending directly between the second wheel cylinder and the second master cylinder;
a second brake pedal connected to the second master cylinder;
a reservoir connected to the master cylinders for supplying fluid to them;
an electrically driven hydraulic pump connected to the reservoir;
a third fluid line connected to the output of the pump and leading to the bleedoff ports of each of the wheel cylinders; and
valve means in the third fluid line for allowing flow from the pump to each of the wheel cylinders, but preventing flow in the opposite direction, thereby allowing fluid to be pumped by the pump directly from the reservoir to the wheel cylinders and thence through the first and second fluid lines to the master cylinders to maintain a supply of fluid in the wheel cylinders and first and second fluid lines should a leak occur therein;

the pressure exerted by the pump being insufficient to actuate the first and second wheel cylinders to cause braking;

the pressure exerted by the master cylinders being sufficient to overcome the pump flow and close the valve means for braking.

2. The hydraulic brake system according to claim 1 wherein the valve means comprises a first check valve located at the bleedoff port of the first wheel cylinder, and a second check valve located at the bleedoff port of the second wheel cylinder.

3. An aircraft hydraulic brake system having an emergency fluid circulating system for maintaining a supply of fluid in the fluid lines should a leak occur, comprising:

a first master cylinder;

a first wheel cylinder connected to a first wheel brake on one side of the aircraft;

a first fluid line extending directly between the first wheel cylinder and the first master cylinder;

a first brake pedal connected to the first master cylinder;

a second master cylinder;

a second wheel cylinder connected to a second wheel brake on the side of the aircraft opposite the first wheel brake;

a second fluid line extending directly between the second wheel cylinder and the second master cylinder;

a second brake pedal connected to the second master cylinder;

a first reservoir connected to both of the master cylinders for supplying fluid to them;

a second reservoir;

overflow means for allowing fluid from the first reservoir to flow into the second reservoir when the first reservoir is full;

a third fluid line connecting the second reservoir to the bleedoff port of each of the wheel cylinders;

an electrically driven hydraulic pump connected into the third fluid line for pumping fluid from the second reservoir through the bleedoff ports, into the first and second fluid lines and to the first reservoir, thence to return to the second reservoir via the overflow means; the pressure exerted by the pump being insufficient to cause substantial braking by the wheel cylinders; and valve means in the third line between the pump and the bleedoff ports for allowing flow from the pump to each of the wheel cylinders, but preventing flow in the opposite direction.

4. The hydraulic brake system according to claim 3 wherein the reservoirs each have a top and the overflow means comprises a conduit extending from the top of the second reservoir into the top of the first reservoir.

* * * * *